United States Patent
Cameron et al.

(10) Patent No.: US 7,616,455 B2
(45) Date of Patent: Nov. 10, 2009

(54) POWER FACTOR CORRECTION USING CURRENT SENSING ON AN OUTPUT

(75) Inventors: Robert Fraser Cameron, Vancouver (CA); Haakon MacCallum, New Westminister (CA)

(73) Assignee: Delta-Q Technologies Corp., Burnaby (CA)

( * ) Notice: Subject to any disclaimer, the term of this patent is extended or adjusted under 35 U.S.C. 154(b) by 321 days.

(21) Appl. No.: 11/331,067

(22) Filed: Jan. 13, 2006

(65) Prior Publication Data

US 2007/0133233 A1    Jun. 14, 2007

Related U.S. Application Data

(60) Provisional application No. 60/748,602, filed on Dec. 9, 2005.

(51) Int. Cl.
*H02M 3/335*    (2006.01)

(52) U.S. Cl. ................................. 363/16; 363/97

(58) Field of Classification Search ......... 323/282–286, 323/222, 268, 271, 272, 258–259, 262; 363/65, 363/40, 41, 89, 49, 39, 74, 124, 84–85, 127, 363/125; 307/64–66, 86, 87; 361/58, 64, 361/103

See application file for complete search history.

(56) References Cited

U.S. PATENT DOCUMENTS

| 3,938,024 | A | | 2/1976 | Clarke |
| 4,885,675 | A | | 12/1989 | Henze et al. |
| 5,001,620 | A | * | 3/1991 | Smith ........................ 363/89 |
| 5,034,871 | A | * | 7/1991 | Okamoto et al. ............. 363/15 |
| 5,077,486 | A | * | 12/1991 | Marson et al. .............. 205/728 |
| 5,490,057 | A | * | 2/1996 | Vinciarelli et al. ............ 700/37 |
| 5,602,462 | A | * | 2/1997 | Stich et al. .................. 323/258 |
| 6,320,772 | B1 | * | 11/2001 | Doyama et al. ............... 363/89 |
| 6,462,966 | B1 | | 10/2002 | Leung et al. |
| 6,809,678 | B2 | * | 10/2004 | Vera et al. ................... 341/166 |
| 6,841,979 | B2 | * | 1/2005 | Berson et al. ................ 323/282 |
| 6,862,201 | B2 | | 3/2005 | Hodge, Jr. |
| 2002/0149951 | A1 | | 10/2002 | Leung et al. |

* cited by examiner

*Primary Examiner*—Rajnikant B Patel
(74) *Attorney, Agent, or Firm*—Brett J. Slaney; John R. S. Orange; Blake, Cassels & Graydon LLP

(57) ABSTRACT

A method and apparatus for circuit conditioning, such as for providing power factor correction, is provided, using existing or minimal additional circuitry, at minimal or no additional cost to the manufacture of the circuit. The circuit conditioning is implemented by controlling an output side of the circuit based on a value sensed on the output side of the circuit and a relationship between the output side and an input side of the circuit.

17 Claims, 3 Drawing Sheets

POWER FACTOR CORRECTION USING CURRENT SENSING ON AN OUTPUT

This application claims priority from U.S. Provisional Patent Application No. 60/748,602 filed Dec. 9, 2005.

FIELD OF THE INVENTION

The present invention relates to a method and apparatus for conditioning electrical circuits.

DESCRIPTION OF THE PRIOR ART

Conditioning of electrical circuits such as power supplies, power converters, and controllers, is often desired or required to achieve or maintain particular performance measures for that circuit. Conditioning typically involves adjusting or controlling a parameter or signal based on a parameter or signal measured in the circuit. An example of such circuit conditioning is power factor correction (PFC) for a power supply.

PFC is a process where the input current drawn by the power supply is controlled to follow the input voltage in both shape and time. PFC is becoming more commonly used in power supplies, and consumers often desire power supplies that include PFC due to the perceived benefits thereof. For example, some utility companies add additional charges or penalize customers having equipment that does not include PFC or has poor power factor. Moreover, various areas of the world now require PFC in products before they can be sold in that area, most notably in Europe.

With high powered power supplies, often the power of the supply is limited by the power available from the electrical source. PFC generally allows more power to be drawn from the source at the same current, thereby allowing fewer and/or smaller circuits.

In general, implementing PFC adds additional cost to a power supply, which puts manufacturers at an immediate disadvantage when offering such a feature. In an area such as North America where PFC is not currently required, unless a customer is required to have PFC, they would be able to choose a lower cost alternative, typically a power supply that does not have PFC. Also, customers wishing to upgrade a power supply to include PFC are faced with the additional cost associated with such a feature, which is generally undesirable.

In specific power supply applications such as battery charging, accurate sensing of the output current and voltage is important for good battery charging. Galvanic isolation is also required to receive approval from safety organizations such as the Canadian Standards Association (CSA). Therefore, battery chargers typically have sensors for sensing battery voltage and current, as well as a controller that is connected to the secondary side (battery side) of the galvanic isolation. Isolation is most often provided by a transformer. Typically, when PFC is added to a battery charger, a current sensor and controller needs to be added to the primary side (input side) of the transformer as well. The addition of such components can be prohibitively expensive.

A typical power supply using PFC will utilize the sensor on the primary side to measure the input current. A measurement of the input current is used by the controller on the primary side to provide PFC. U.S. Pat. No. 4,885,675 to Henze et al. published on Dec. 5, 1989 provides an example of such a power supply having PFC. For such a circuit to be used as a battery charger, an output voltage sensor, output current sensor, and a controller would also typically be added. The circuit taught by Henze would then also include a current sensor and controller on the input or primary side of the galvanic isolation in addition to the circuitry required on the output side. Therefore, Henze provides PFC through the addition of circuitry on the primary side of the isolation to control the input signal, which adds cost to the manufacture of the unit.

There exists a need to provide PFC to a power supply at little or no extra cost to the manufacturer, and ultimately the consumer. This need also extends to circuit conditioning in general that requires sensing and control of certain parameters in the circuit.

It is therefore an object of the present invention to obviate or mitigate the above-described disadvantages.

SUMMARY OF THE INVENTION

In a preferred, non-limiting embodiment, circuit conditioning such as power factor correction is provided using existing or minimal additional circuitry, by controlling an output side of the circuit based on a value sensed on the output side of the circuit and a relationship between the output side and an input side of the circuit.

In one aspect, a conditioner for an electrical circuit having an input side and an output side is provided. The conditioner comprises a sensor for measuring an output electrical parameter of the output side; and a controller connected to the sensor, the controller receiving a value indicative of the output parameter and generating a control signal to control the output parameter based on a known relationship between the output parameter and a corresponding input parameter of the input side; wherein controlling the output parameter conditions the corresponding input parameter.

In another aspect, a method for conditioning an electrical circuit having an input side and an output side is provided. The method comprises the steps of sensing an output electrical parameter of the output side; generating a control signal based on a known relationship between the output parameter and a corresponding input parameter of the input side; and using the control signal to control the output parameter for conditioning the corresponding input parameter.

In yet another aspect, the above conditioner and method are implemented in a power supply wherein the input parameter is an AC signal, the output parameter is a DC signal, the input side is galvanically isolated from the output side, and controlling the output parameter provides power factor correction.

BRIEF DESCRIPTION OF THE DRAWINGS

An embodiment of the invention will now be described by way of example only with reference to the appended drawings wherein.

DETAILED DESCRIPTION OF THE INVENTION

Figure 1:
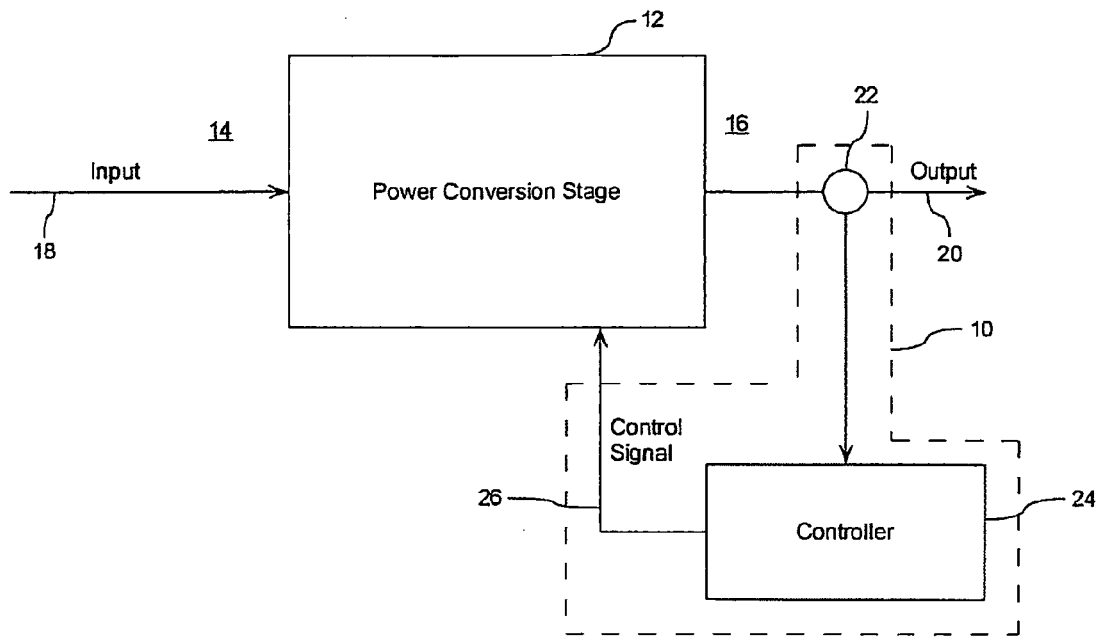
FIG. 1 is a block diagram of a circuit conditioner implemented with a generic circuit.

Referring therefore to FIG. 1, a circuit conditioner for a power converter is generally constructed with a control stage 10 and a power conversion stage 12, commonly referred to as a plant. In general, the plant 12 has an input side 14 and an output side 16. An input signal 18 having a measurable parameter exists at the input side 14 of the plant 12, and an output signal 20, also having a measurable parameter, exists at the output side 16. The circuit conditioner 10 has a sensor 22 that interacts with the output signal 20. The sensor 22 obtains a value indicative of a parameter of the output signal 20, and provides this value to a controller 24. The controller 24 uses the value to generate a control signal 26 for use by the plant 12 to control the output signal 20.

The plant 12 may be any circuit having an input side 14 and an output side 16, wherein a relationship exists between corresponding measurable parameters thereof. Preferably, the relationship between the parameters, and thus the input side 14 and the output side 16 is well defined and substantially consistent during operation of the circuit. The plant 12 is also capable of being conditioned by having one or more parameter controlled by the control signal 26, wherein such parameters are preferably associated with the input signal 18 and output signal 20, e.g., power.

The sensor 22 may comprise any suitable circuitry or component that can measure a particular parameter of the output signal 20. For example, the sensor 22 may be a current sensor that lies in the path of the output signal 20 as shown in FIG. 1. Alternatively, the sensor 22 may also measure voltage, wherein a voltage measurement is taken at a point on the output side 16 and compared to a reference. In such an alternative, the sensor 22 would not lie in the path of the output signal 20 as shown in FIG. 1 but measure voltage at a measurement point. It will be appreciated that the sensor 22 shown in FIG. 1 is for illustrative purposes only, and may be altered or replaced as necessary depending on the type of parameter being measured.

The controller 24 may be implemented using software or hardware, and may be included in the plant 12 or on its own as shown in FIG. 1. Suitable controllers include integrated circuits (IC), digital signal processors (DSP) and software packages implemented on a separate computing module (not shown). The controller 24 is capable of receiving an input from the sensor 22 and processing the input to produce the control signal 26 based on, for example, predetermined algorithms, parameters, look-up tables, etc.

The control signal 26 is preferably sent to a portion of the plant 12 that controls the output signal 20, wherein the nature of the control signal 26 dictates any change required in the output signal 20 for conditioning the plant 12. The embodiments shown in FIGS. 2-5, and described below provide examples of the use of the control signal 26 for conditioning the plant 12.

In general, the circuit conditioner 10 operates to condition the plant 12 by controlling the output side 16 of the plant 12 based on a value sensed on the output side 16 of the circuit and a relationship between the output side 16 and the input side 14 of the plant 12.

Figure 2:
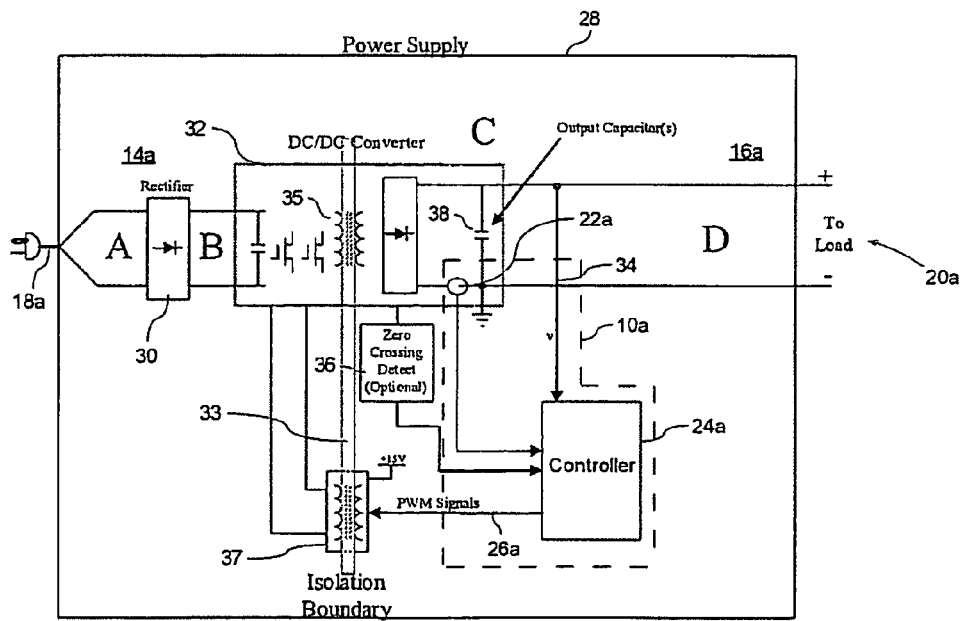
FIG. 2 shows an embodiment of the circuit conditioner of FIG. 1 implemented in a power supply.

An embodiment of the circuit conditioner 10 is shown in FIG. 2, used with a power supply circuit 28 having a generic topology to convert alternating current (AC) input to a fixed direct current (DC) voltage and current output. In this embodiment, like elements are given like numerals with the suffix "a". The circuit conditioner 10a is used for providing power factor correction (PFC) to the power supply 28. Although the embodiments herein relate to PFC for power supplies, it will be appreciated that the concepts described herein may extend to other circuits and other circuit conditioning.

In many PFC power supplies, such as the power supply 28 shown in FIG. 2, there may be a component for storing energy, e.g. a capacitor 38. When implemented with a power supply as shown in FIG. 2, the capacitor is likely, but does not need to be, large.

If the capacitor is small, and the load is resistive, the voltage and current will be a rectified sine wave. If the load has a large input capacitance, the output voltage is DC and the output current is $\sin^2$. A small capacitor is generally one that is small enough that the capacitor does not significantly attenuate the harmonic of the output current waveform, which is the second harmonic of the input voltage waveform.

If the capacitor 38 is large, the capacitor 38 allows the power supply 28 to output a constant DC voltage, even though the input voltage (e.g. of signal 18a) varies sinusoidally over the AC waveform. When large, the capacitor 38 is used to filter the fundamental frequency component of the input AC waveform as well as the high frequency components of the PWM switching. A large capacitor is generally one that is large enough to attenuate the harmonic of the output current waveform.

The current sensor 22a is preferably located before the capacitor 38 since the current after capacitor 38 is essentially DC.

In the power supply 28 of FIG. 2, there are four points of interest, namely A, B, C, and D. At point A, the current and voltage signals are sinusoidal; at point B, the current and voltage signals are rectified sine waves; at point C, the voltage is steady DC, while the current signal is a squared sinusoid (i.e. $\sin^2$); and at point D, the output voltage and current are both substantially DC.

For example, if at point A, $I_i=I_p \sin(\theta)$ and $V_i=V_p \sin(\theta)$, where $I_p$=peak input current, $V_i$=peak input voltage, and $\theta$=the input AC line frequency in radians, then input power $P_i=V_i I_i=V_p I_p \sin^2(\theta)$. Neglecting efficiency of conversion, instantaneous power is conserved between points A and C (i.e. $P_o=P_i$). Given a substantially fixed output voltage $V_o$ at point C, current at point C can be characterized by $I_c=P_i/V_o=V_p I_p \sin^2(\theta)/V_o$, i.e. a squared sinusoid function.

The relationship between input current at point A and output current at point C is therefore known, and in this example, $Ic=f(I_i)=(V_p/V_o)\sin(\theta)I_i$. At point D, the $\sin^2$ current ripple is filtered by capacitor 38, so the output current $I_o=I_{avg}$. For a power supply with an idealized, perfect power factor, average power is conserved between input and output, i.e. $V_{i(rms)} I_{i(rms)}=V_o I_{avg}$, therefore, $I_{avg}=V_{i(rms)}I_{i(rms)}/V_o=V_p I_p/2V_o$. The relationship of current between points C and D can thus be stated as $I_c=2I_{avg} \sin^2(\theta)$.

In the circuit 28, the input side 14a and output side 16a are galvanically isolated along the isolation boundary 33. Galvanic isolation is achieved with a power converter transformer 35 and a signal transformer 37. Alternatively, capacitive or optical methods may be used to provide galvanically isolated gate drive to the power converter.

In the circuit 28 shown in FIG. 2, the controller 24a measures the current and voltage of the output 20a, using the current sensor 22a, and a voltage measurement 34 respectively. In this example, an input AC voltage zero detection crossing circuit 36 is also used, and the signal generated thereby is measured by the controller 24a. Using the measurements from the sensor 22a, the voltage measurement 34, and zero detection circuit 36, the controller 24a generates the required drive signal for the switches in the DC/DC converter 32, which in this case is a pulse width modulated (PWM) signal 26a. The controller 24a also generates a reference waveform for the output current (not shown).

The reference waveform is the waveform that the output parameter is supposed to follow, so that the input parameter follows its desired waveform. The desired waveform for the input parameter is known, since control of the input waveform is what is desired. Since the relationship between the input parameter and some output parameter of the plant 12 is known, the reference waveform can be calculated for the output parameter based on this known relationship. In this example, the reference waveform is a function of the desired input waveform and the input to output transfer function of the plant 12.

Figure 3:
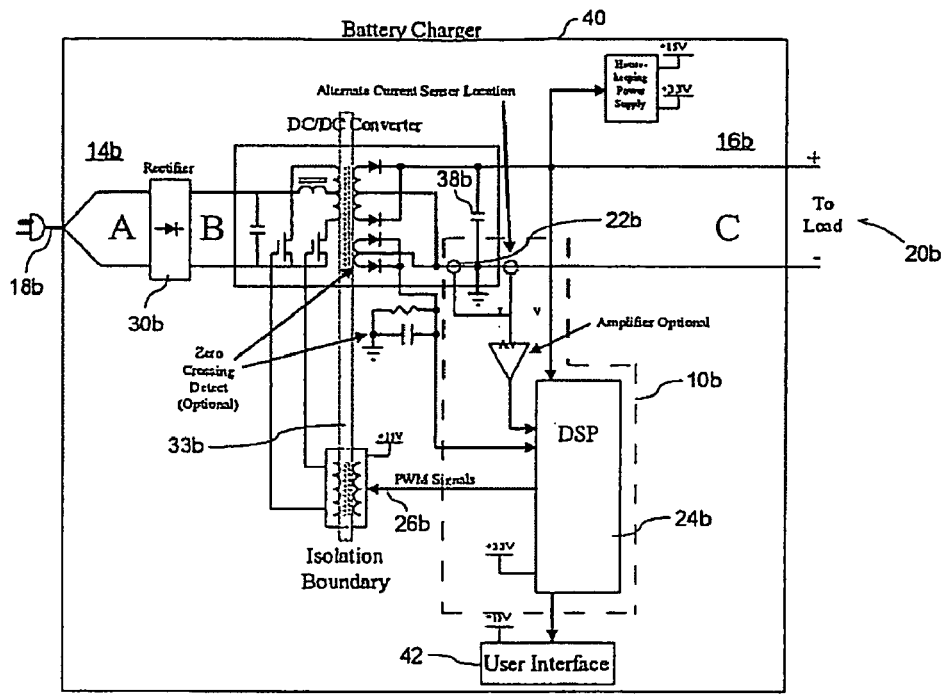
FIG. 3 shows an embodiment of the circuit conditioner of FIG. 1 implemented in a battery charger.

In the example shown in FIG. 3, the desired input current is sinusoidal. Knowing that the output 20*b* in FIG. 3 is a relatively steady DC voltage set by the battery being charged, the desired shape of the current of the output 20*b* will be $\sin^2$ as discussed above.

The magnitude of the reference waveform is calculated from the desired magnitude of the controlled output parameter. In this example, the controlled output parameter is current, and in the case of a battery charger (e.g. FIGS. 3 or 4), the desired output current is determined by the desired output voltage and current required to charge the battery. For example, if a battery requires a particular average current, then the average value of the reference waveform is made equal to the value required by the battery. In the case where the output current waveform is $\sin^2$, the average of the $\sin^2$ waveform is equal to ½ of the peak of the waveform.

In the case of a PFC corrected power supply or battery charger, the reference waveform (which is a $\sin^2$ output current waveform) should also be synchronized to the input voltage waveform. In this particular implementation, the zero crossing detection circuit 36 is used to generate time signals indicating to the controller 24 when the input voltage waveform crosses zero volts. In this case, the points where the reference waveform is zero (amps) are synchronized with the zero crossings of the input voltage.

The controller 24*a* varies the duty cycle of the PWM signal 26*a* according to the reference waveform, in an attempt to have the output signal 20*a* conform to the reference waveform. By adjusting the output signal 20*a* according to the reference waveform, using the PWM signal 26*a*, PFC can be accomplished for the power supply circuit 28.

The conditioner 10*a* is most preferably used with power supplies that operate in a "continuous current" mode, as opposed to "discontinuous current" mode, because other options exist to achieve PFC for discontinuous operation. Continuous vs. discontinuous refers to the current flowing in the inductance of the power supply, whether or not the magnetic flux in the inductor returns to zero on each switching cycle (in a flyback topology the inductor and transformer are integrated into one magnetic part). The flux in a continuous current mode power supply does not drop to zero. Discontinuous operation is often disadvantageous because it is generally not suited to applications requiring high power, i.e., more than 250-400 W.

The conditioner 10*a* can generally be used with any power supply topology that can perform active PFC. Generally, only topologies that employ high frequency switching will meet such a requirement. High frequency switching refers to a topology wherein the switch components in the supply cycle operate at a frequency that is substantially higher than the frequency of the AC input. However, even more generally, the conditioner 10*a* relies on there being a known relationship between the input and output of the particular circuit with which it is being used. Therefore, although the conditioner 10 is shown to be implemented specifically with power supply 28, the concept of conditioning the plant 12 based on the output side 16 and a known relationship between the input and output (as shown in FIG. 1), can extend to other circuits as well.

Figure 4:
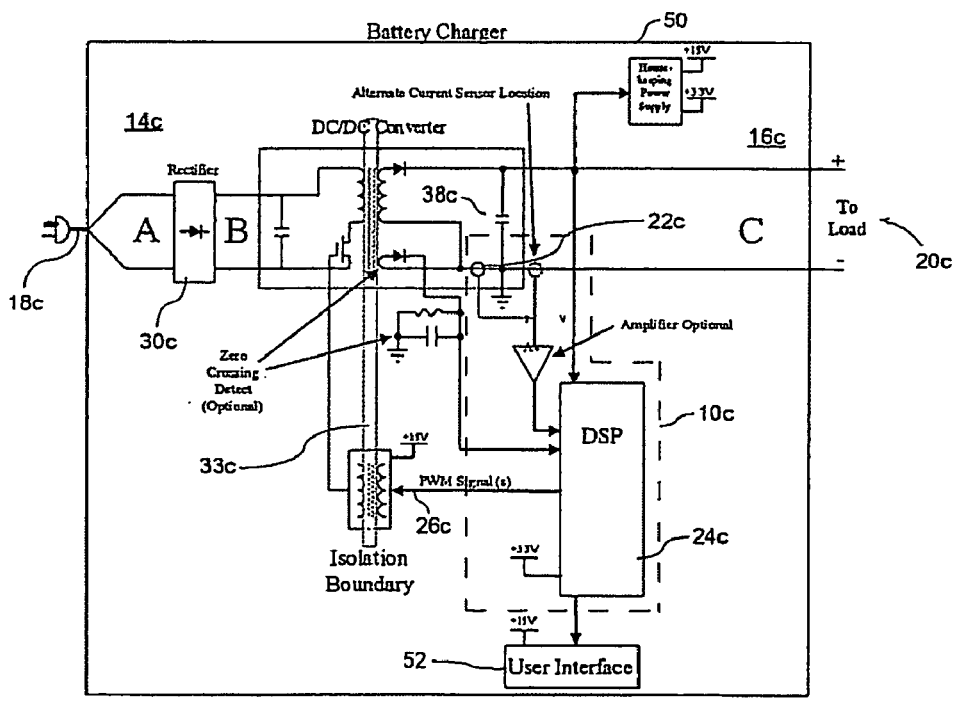
FIG. 4 shows an embodiment of the circuit conditioner of FIG. 1 implemented in a battery charger having a different circuit topology than that shown in FIG. 3.

FIG. 3 illustrates an embodiment where the conditioner 10 is implemented on a Clarke or current-fed push-pull topology, and like elements are given like numerals with the suffix "b" (e.g. conditioner 10*b*). FIG. 4 shows the conditioner 10 implemented on a flyback topology, wherein like elements are given like numerals with the suffix "c" (e.g. conditioner 10*c*). The application generally determines which topology is most suitable. FIGS. 3 and 4 are shown to illustrate that the conditioner 10 shown in FIG. 1 may be adapted to any suitable plant 12, such as the battery charger 40 in FIG. 3 and the battery charger 50 in FIG. 4. When implementing the conditioner 10 with a particular topology, characteristics such as cost, voltage levels and power levels are typically considered in making such a decision.

In the embodiments of FIGS. 3 and 4, i.e. in a battery charger application, capacitors 38*b* and 38*c* respectively may be significantly reduced in size and cost, such that they only filter the high frequency current components of the PWM signals 26*b* and 26*c* respectively, since the battery itself maintains a relatively constant voltage. As a result, the battery will see the low frequency $\sin^2$ AC currents, which is generally not detrimental to battery life. In this case (i.e. when the capacitor 38*b* or 38*c* is relatively small), the "Alternate Current Sensor Location" shown in dashed lines in FIG. 2 may be used.

In the embodiments of FIGS. 3 and 4, the controllers 24*b* and 24*c* respectively are implemented using a digital signal processor (DSP) for digital control. Such an implementation is suitable when the existing circuit does not include an IC designed to perform signal conditioning. Accordingly, a DSP offers the ability to customize the control of the conditioner 10*b* or 10*c* to provide, for example, PFC, while maintaining relatively low cost. Also shown in FIGS. 3 and 4 are user interfaces 42 and 52, to enable the conditioners 10*b* and 10*c* to output data; and galvanic isolation boundaries 33*b* and 33*c*. It is apparent from FIGS. 3 and 4 that the conditioners 10*b* and 10 *c* can be implemented with the specific topologies shown therein according to the general concepts shown in FIGS. 1 and 2, with specific circuitry included as required for operation of the particular topology.

Figure 5:
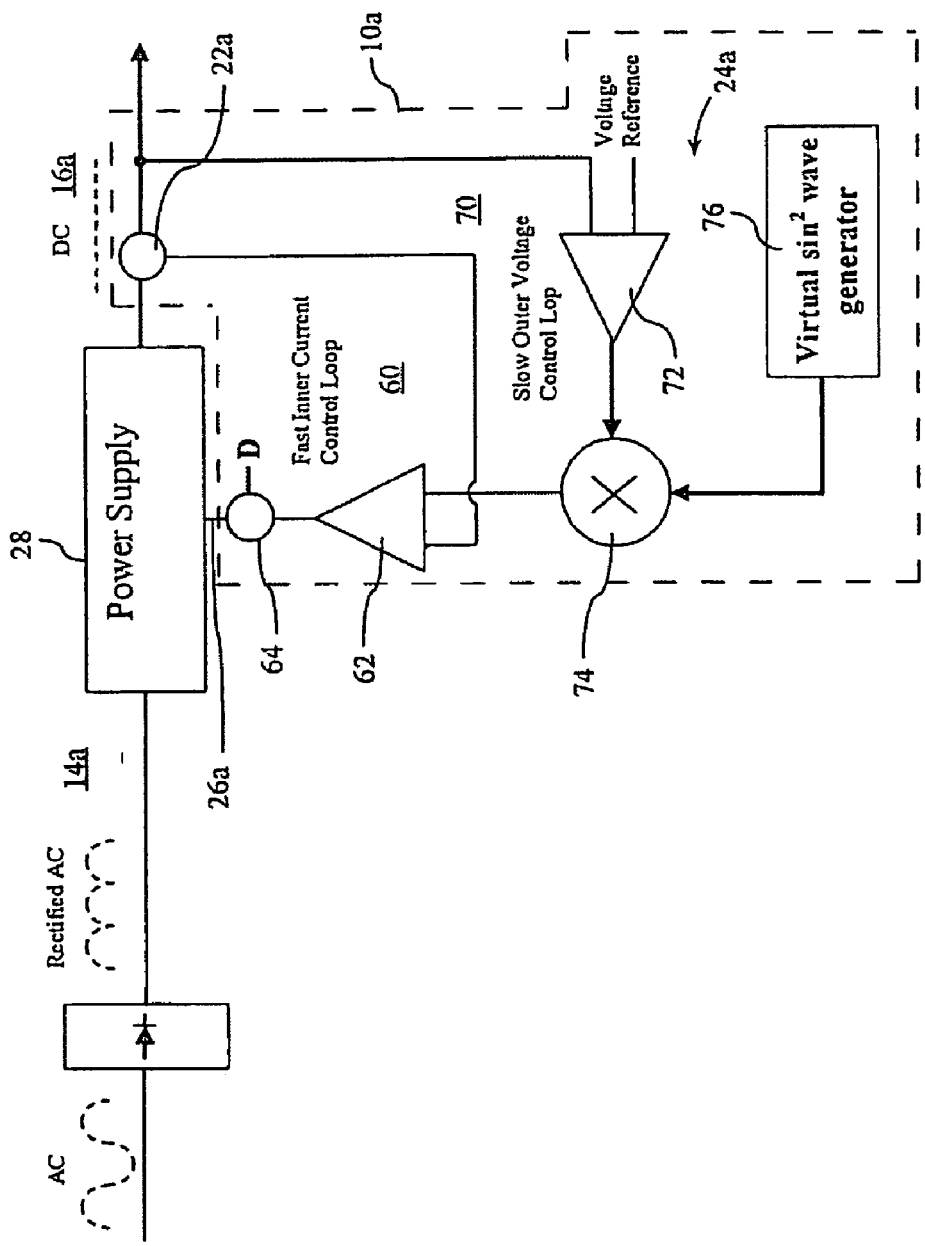
FIG. 5 is a control diagram for the power supply of FIG. 2.

FIG. 5 shows a control diagram illustrating the general control loops for the conditioner 10*a* shown in FIG. 2 for providing PFC. As indicated above, the conditioner 10*a* relies on there being an existing relationship between the output signal 20*a* and the input signal 18*a*. Using this relationship, the desired current waveform can be used to calculate the required output current waveform. Control loops are utilized to force the output current to follow the required output current waveform.

In the exemplary control diagram of FIG. 5, a source AC signal is rectified using the input rectifier 30 to produce the rectified AC (DC) signal 14*a*. The rectified AC signal 14*a* is input to the power supply 28, which performs the actual power conversion, to produce the DC output 16*a* to provide to the battery (not shown). The DC output 16*a* flows through the output current sensor 22*a*, and the sensor 22*a* produces an output that is proportional to the output current. This signal is provided to the DSP 24*a*, particularly to the fast current comparator 62. The other input to the fast current comparator 62 originates from the output of the multiplier 74.

The multiplier 74 multiplies the output signal from the output voltage comparator 72, with a reference waveform generated by a virtual sine wave generator 76. The virtual sine wave generator 76 is typically a routine that is internal to the controller 24*a*, e.g. programmed into the DSP 24*b* or 24*c*. If the input current in the PFC power supply 28 is substantially sinusoidal, the output current is generally the square of the sinusoid. The waveform generated by the sine wave generator 76 may be generated by table lookup or by an equation programmed in the controller 24a. In other implementations, an analogue sine wave generator (not shown) could also be used. The reference waveform is substantially synchronized with the input AC source sine wave. Preferably, a timing signal for the generator 76 (not shown) is generated by the power supply 28. If the power supply 28 does not generate any output voltage, the input voltage must be zero. Therefore, an output is created which is either "on" or "off", where the "off" times correspond to the zero crossings of the input AC sine wave.

The inputs to the comparator 72 are the actual output voltage and the desired output voltage supplied by a voltage reference signal. The output of the comparator 72 is an average desired output current. The comparator 72 compares the actual and desired output voltage to generate the desired average output current signal. In this example, if the actual output voltage is too low, the desired average output current will be increased, and vice versa.

The output of the fast current comparator 62 is a duty cycle signal that is summed at point 64 with a compensation signal "D". The fast current comparator 62 compares the actual and desired output current, and in this example, increases the duty cycle if the actual current is too low, and decreases duty cycle if the actual current is too high. The output of the sum point 62 is a duty cycle signal that is used to control the input of the power supply. In this example, the compensation signal D is calculated as the theoretical duty cycle of the power supply 28 at the measured operating conditions of the power supply 28.

The output of the point 64 is the control input 26a to the power supply 28. In this example, the input 26a is used to control the on/off commands to the MOSFET switches (not shown) in the power supply 28. Varying the duty cycle of the control input 26a, controls the output DC 16a to the battery (not shown).

PFC is typically accomplished with the above described components using two control loops as shown in FIG. 5, namely, an inner fast current control loop 60, and an outer slow voltage control loop 70. The fast loop 60 varies the duty cycle of the power supply 28 using the PWM signal 26a, to force the current of the power supply 28 to follow a reference. The slow loop 70 is responsible for varying the amplitude of the current loop reference, wherein increasing the amplitude increases the output current, and decreasing the amplitude decreases the output current.

The fast loop 60 usually has a "crossover frequency", which is the frequency at which the gain of the fast current comparator 62 falls below one (1), that is well above the fundamental frequency of the input voltage, often between 1 and 10 kHz. The slow loop 70 usually has a crossover frequency (i.e. with respect to amplifier 72) that is below the frequency of the input voltage, often 10 Hz.

It will be noted from FIG. 5 that the current sensor 22 is placed on the output side 16a of the power supply 18. Therefore, the output current is measured and controlled, rather than the input current being measured and controlled.

In this example, to improve the resultant power factor of the power supply 28, the calculated theoretical duty cycle of the power supply 28 is summed into the control signal at point D. This improvement compensates for the reduction in control gain required, because the output current of a boost type power supply is being controlled. It is generally understood that it is "difficult" to control the output of a boost type converter, "difficult" meaning that the gain/frequency response of the control should be reduced.

Since many circuits 12, most notably power supplies for battery chargers, already measure output current and output voltage, and often already have a controller 24, circuit conditioning such as PFC can be added at relatively low cost. In the case where a controller 24 is not already present, it can be provided at reasonable cost be adding a DSP (e.g. 24b or 24c) to control PFC. The output signal 20 of the plant 12 can be controlled by the controller 24 based on a measure of a parameter of the output signal 20 and a known relationship between the output signal 20 and an input signal 18 to the plant 12. For example, a reference waveform can be generated based on the known relationship between input 18 and output 20, and a control signal 26 (e.g. PWM signal 26a) can be used to force the output signal 20 to follow the reference.

Although the invention has been described with reference to certain specific embodiments, various modifications thereof will be apparent to those skilled in the art without departing from the spirit and scope of the invention as outlined in the claims appended hereto.

What is claimed is:

1. A power convertor performing power factor correction comprising: a power conversion stage having an input side and an output side electrically isolated from each other across a boundary of isolation; and a control stage connected to said output side, said control stage comprising:
   a sensor for measuring an output electrical parameter of said output side; and
   a controller connected to said sensor and to said output side of said power conversion stage,
   said controller having accessibly stored a known relationship between said output electrical parameter and a corresponding input electrical parameter of said input side,
   said controller being operationally configured to generate a reference waveform indicative of a desired waveform for said output electrical parameter that achieves a desired waveform for said input electrical parameter based on said stored known relationship,
   said controller being further operationally configured to receive from said sensor a value indicative of said output electrical parameter, to generate a control signal based on a comparison of said value with said reference waveform, and to send said control signal back to said power conversion stage;
   wherein said power conversion stage is operationally configured to use said control signal received from said controller to modify said output electrical parameter and thereby condition said input electrical parameter and provide power factor correction based on said stored known relationship without measuring said input electrical parameter and using only parameters measured on said output side.

2. The power convertor of claim 1 included in a power supply wherein said input electrical parameter is an AC signal, said output electrical parameter is a DC signal, and said electrical isolation is galvanic isolation.

3. The power convertor of claim 1 wherein said reference waveform is a function of said desired waveform of said input electrical parameter and an input-to-output transfer function of said circuit.

4. The power convertor of claim 1 further comprising a zero crossing detection circuit for indicating to said controller, when said input electrical parameter has a value of zero.

5. The power convertor of claim 1 wherein said control signal is a pulse width modulated (PWM) signal, said control signal being varied by adjusting the duty cycle of said PWM signal.

6. The power convertor of claim 1 wherein said controller is implemented using one of an integrated circuit (IC), digital signal processor (DSP), and software.

7. The power convertor of claim 2 wherein said power supply operates in a continuous current mode.

8. The power convertor of claim 2 wherein said input and output electrical parameters are one of current and voltage.

9. The power convertor of claim 2 utilizing a high frequency switching topology including one of a Clark, current-fed push-pull, and flyback topology.

10. A method for performing power factor correction in a power converter comprising a power conversion stage having an input side and an output side electrically isolated from each other across a boundary of isolation, said method comprising the steps of:
providing a control stage for said power converter on said output side, said control stage comprising a sensor for measuring an output electrical parameter of said output side and a controller connected to said sensor and to said output side of said power conversion stage;
storing for said controller, a known relationship between said output electrical parameter and a corresponding input electrical parameter of said input side;
generating a reference waveform indicative of a desired waveform for said output electrical parameter that achieves a desired waveform for said input electrical parameter based on said stored known relationship;
receiving from said sensor, a value indicative of said output electrical parameter;
generating a control signal based on a comparison of said value with said reference waveform;
sending said control signal back to said power conversion stage to modify said output electrical parameter; and
said power conversion stage using said control signal to modify said output electrical parameter and thereby condition said input electrical parameter and provide power factor correction based on said known relationship without measuring said corresponding input electrical parameter and using only parameters measured on said output side.

11. The method of claim 10 used in a power supply wherein said input electrical parameter is measured from an AC signal, said output electrical parameter is measured from a DC signal, and said electrical isolation is galvanic isolation.

12. The method of claim 10 wherein said reference waveform is a function of said desired waveform of said input electrical parameter and an input-to-output transfer function of said circuit.

13. The method of claim 10 further comprising the step of detecting when said input electrical parameter has a value of zero using a zero crossing detection circuit.

14. The method of claim 10 wherein said control signal is a pulse width modulated (PWM) signal, and further comprising the step of adjusting the duty cycle of said PWM signal when generating said control signal and using a variation of said duty cycle to control said output electrical parameter.

15. The method of claim 11 wherein said power supply operates in a continuous current mode.

16. A power supply comprising the power convertor of claim 1.

17. A battery charger comprising the power convertor of claim 1.

* * * * *